(12) United States Patent  
Okazaki et al.

(10) Patent No.: US 6,656,621 B2  
(45) Date of Patent: Dec. 2, 2003

(54) FUEL CELL STACK

(75) Inventors: Koji Okazaki, Shiki (JP); Yoshinori Wariishi, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 232 days.

(21) Appl. No.: 09/863,626

(22) Filed: May 23, 2001

(65) Prior Publication Data

US 2001/0046618 A1 Nov. 29, 2001

(30) Foreign Application Priority Data

May 24, 2000 (JP) .......................................... 2000-153531

(51) Int. Cl.[7] .......................... H01M 8/00; H01M 8/24; H01M 8/18; H01M 8/04; H01M 8/12
(52) U.S. Cl. .............................. 429/26; 429/13; 429/18; 429/20
(58) Field of Search .............................. 429/13, 18, 20, 429/26

(56) References Cited

U.S. PATENT DOCUMENTS

| | | | | |
|---|---|---|---|---|
| 4,324,844 A | * | 4/1982 | Kothmann | 429/26 |
| 4,623,596 A | * | 11/1986 | Kamoshita | 429/26 |
| 5,547,776 A | * | 8/1996 | Fletcher et al. | 429/13 |
| 5,565,279 A | * | 10/1996 | Fredley et al. | 429/26 |
| 5,635,039 A | * | 6/1997 | Cisar et al. | 204/252 |
| 5,919,584 A | * | 7/1999 | Akagi | 429/34 |
| 6,083,636 A | * | 7/2000 | Hsu | 429/13 |
| 6,124,051 A | * | 9/2000 | Johnson | 429/26 |
| 6,210,823 B1 | * | 4/2001 | Hatoh et al. | 429/30 |
| 6,306,533 B1 | * | 10/2001 | Mund et al. | 429/26 |
| 6,309,774 B1 | * | 10/2001 | Buchner et al. | 429/38 |
| 6,329,093 B1 | * | 12/2001 | Ohara et al. | 429/32 |
| 6,420,061 B1 | * | 7/2002 | Fujii et al. | 429/26 |

FOREIGN PATENT DOCUMENTS

JP 3-81973 4/1991

\* cited by examiner

*Primary Examiner*—Bruce F. Bell
*Assistant Examiner*—Donald V. Scaltrito
(74) *Attorney, Agent, or Firm*—Lahive & Cockfield, LLP

(57) ABSTRACT

A fuel cell stack comprises a power-generating cell and a cooling cell which are stacked, an insulating means for electrically insulating the cooling medium supplied into the cooling cell from the power-generating cell, and a conducting means for electrically connecting the power-generating cells arranged with the cooling cell interposed therebetween to one another. Accordingly, the earth fault and the liquid junction, which would be otherwise caused by cooling medium, is reliably avoided with a simple structure, making it possible to maintain desired power generation performance.

9 Claims, 8 Drawing Sheets

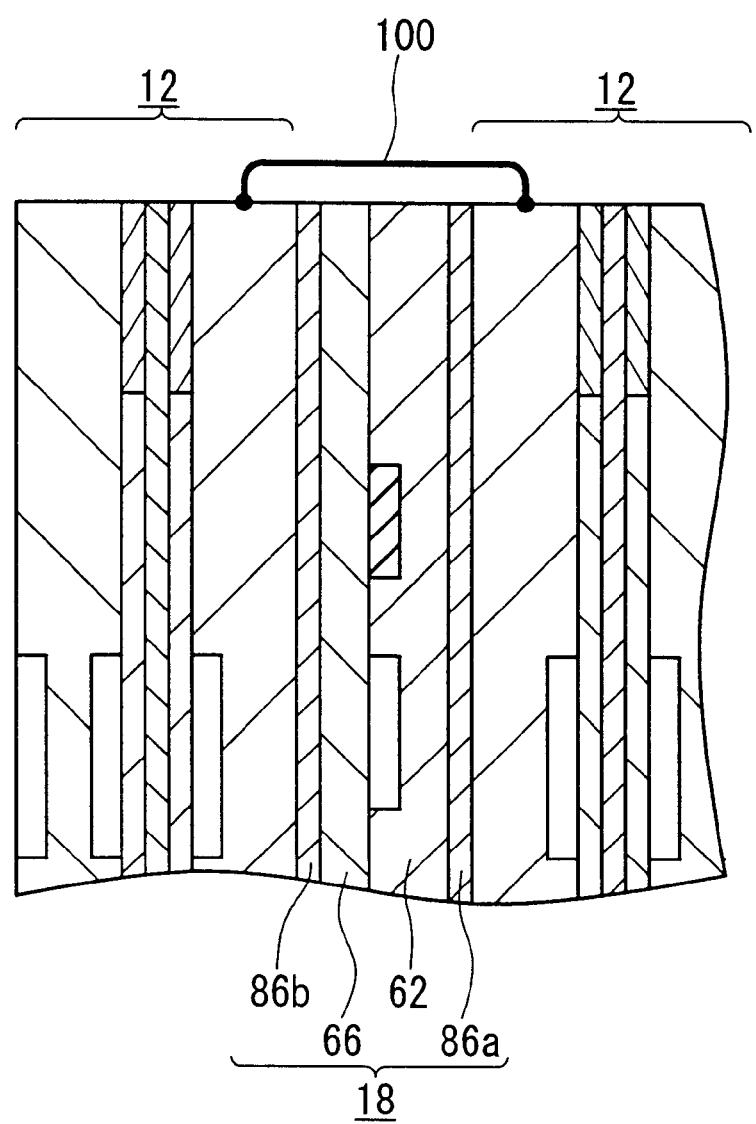

FUEL CELL STACK

BACKGROUND OF THE INVENTION

1. Field of the Invention

The present invention relates to a fuel cell stack provided with a power-generating cell having a joined unit including an electrolyte interposed between an anode electrode and a cathode electrode, the joined unit being interposed between separators so that fuel gas is supplied to the anode electrode, while oxygen-containing gas is supplied to the cathode electrode.

2. Description of the Related Art

For example, the phosphoric acid fuel cell (PAFC) is provided with a power-generating cell constructed such that a joined unit, which comprises an anode electrode and a cathode electrode principally composed of carbon respectively and provided opposingly on both sides of an electrolyte layer composed of a silicon carbide porous material (matrix) impregnated with concentrated phosphoric acid, is interposed between separators (bipolar plates). Usually, a predetermined number of the power-generating cells are stacked to be used as a fuel cell stack.

On the other hand, the solid polymer fuel cell (SPFC) adopts an ion exchange membrane composed of a solid polymer ion exchange membrane (cation ion exchange membrane). Similarly, the solid polymer fuel cell is constructed by stacking a predetermined number of power-generating cells each comprising separators and a joined unit composed of the ion exchange membrane as described above, and it is used as a fuel cell stack.

In such a fuel cell stack, a fuel gas such as a gas principally containing hydrogen (hereinafter referred to as "hydrogen-containing gas" as well), which is supplied to the anode electrode, contains hydrogen which is ionized into ion on the catalyst electrode, and the ion is moved toward the cathode electrode via the electrolyte. The electron, which is generated during this process, is extracted for an external circuit, and the electron is utilized as DC electric energy. An oxygen-containing gas such as a gas principally containing oxygen or air (hereinafter referred to as "oxygen-containing gas" as well) is supplied to the cathode electrode. Therefore, the hydrogen ion, the electron, and the oxygen are reacted with each other on the cathode electrode, and thus water is produced.

As for the fuel cell as described above, in order to exhibit the effective power generation performance, the optimum operation temperature is set. In order to maintain the power-generating cell at the operation temperature, a variety of cooling structures are adopted. In general, the following structure is known. That is, a cooling medium passage is formed on the separator for constructing the fuel cell stack. A cooling medium such as water is supplied to the passage, and thus the power-generating cell is cooled.

In this case, the water to be used as the cooling medium as well as a general coolant to be used for a cooling structure for an automobile is contaminated with any impurity such as ion and any metal-based additive. The conductivity is given to the coolant or the cooling medium itself. On the other hand, also when deionized water or pure water is used for the coolant, then any metal or the like is mixed therein during the circulation through a cooling piping and through a radiator during the operation, and the conductivity is consequently given to the coolant.

However, in the case of the fuel cell stack, the electrons, which are generated in the respective power-generating cells, are extracted from collecting electrodes which are disposed on both end sides. Therefore, if the conductivity is given to the cooling medium as described above, the electricity flows through the cooling medium. Therefore, the following problem is pointed out. That is, the electricity flows, for example, through the cooling piping and through the radiator by the aid of the cooling medium. As a result, the earth fault or the liquid junction takes place, resulting in the decrease in output of the entire fuel cell stack.

SUMMARY OF THE INVENTION

A principal object of the present invention is to provide a fuel cell stack which makes it possible to reliably avoid any electric leakage via a cooling medium and which makes it possible to maintain effective power generation performance with a simple structure.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 shows a magnified sectional view illustrating major components of the fuel cell stack in which power-generating cells are electrically connected to one another with a conducting wire.

DESCRIPTION OF THE PREFERRED EMBODIMENTS

Figure 1:
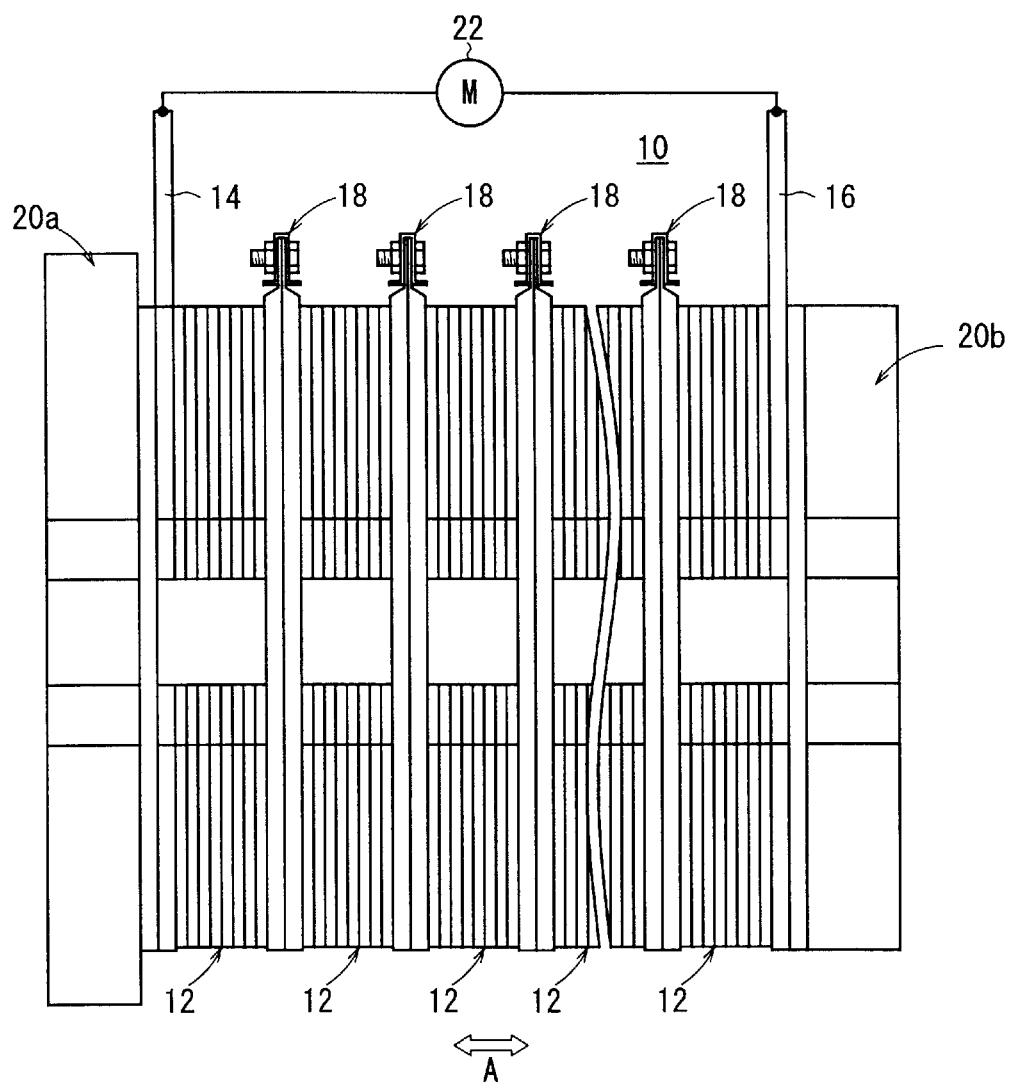
FIG. 1 shows a side view illustrating a schematic arrangement of a fuel cell stack according to an embodiment of the present invention.
Figure 2:
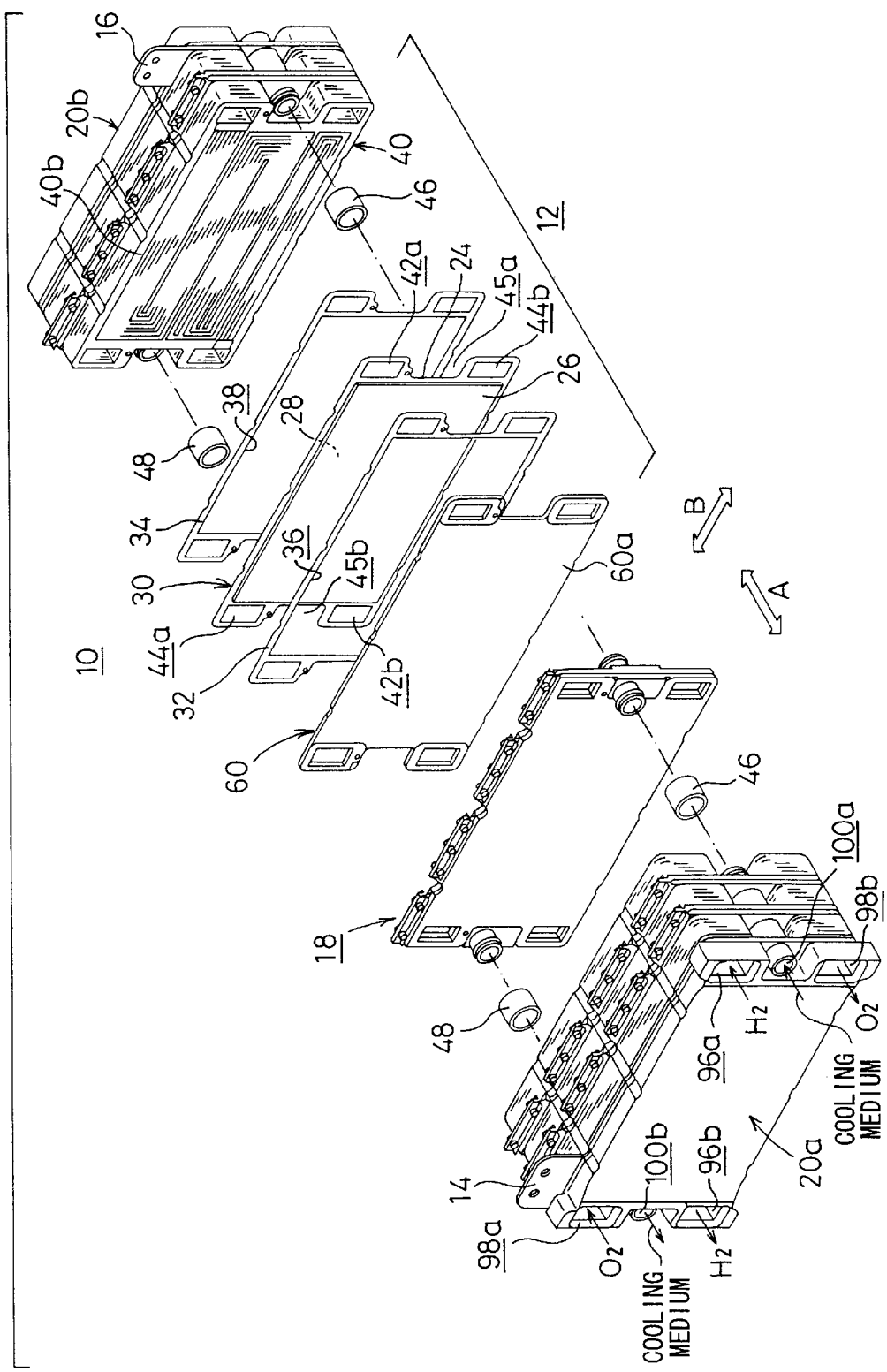
FIG. 2 shows an exploded perspective view illustrating the fuel cell stack.
Figure 3:
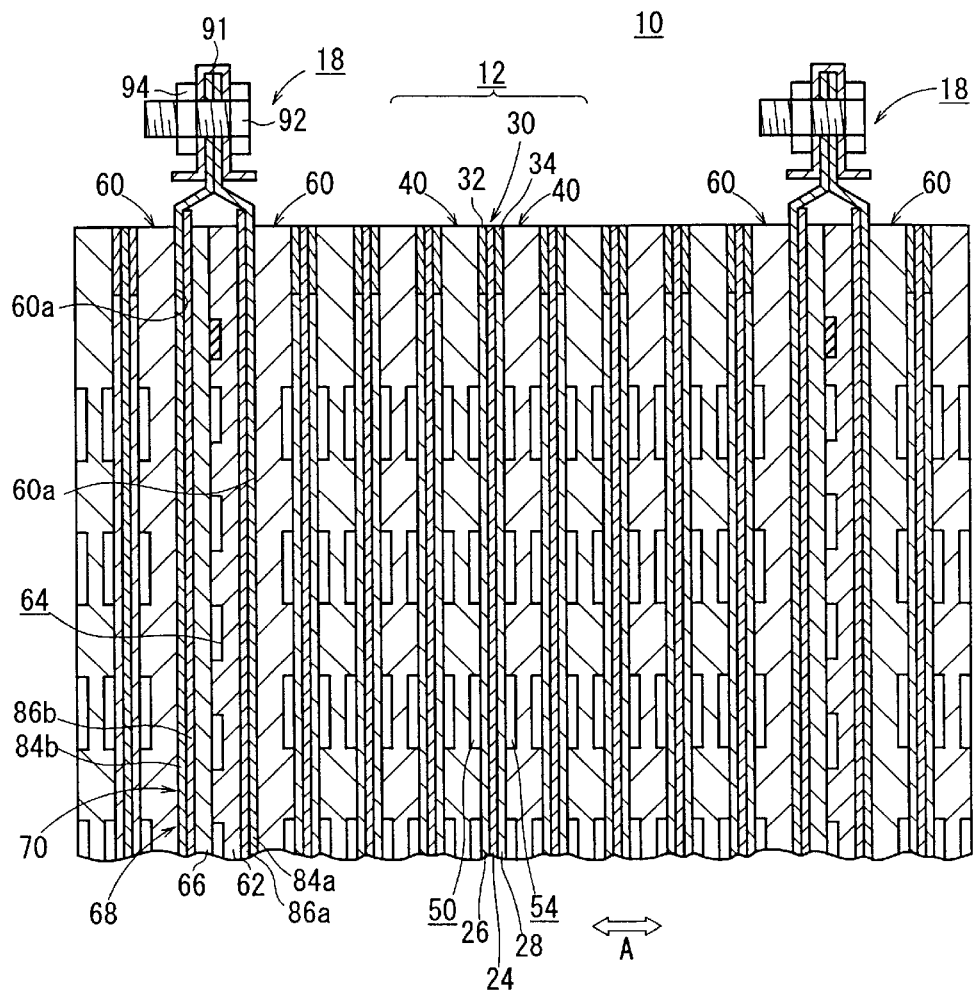
FIG. 3 shows a magnified sectional view illustrating major components of the fuel cell stack.

FIG. 1 shows a side view illustrating a schematic arrangement of a fuel cell stack 10 according to an embodiment of the present invention, FIG. 2 shows an exploded perspective view illustrating the fuel cell stack 10, and FIG. 3 shows a magnified sectional view illustrating major components of the fuel cell stack 10.

The fuel cell stack 10 comprises power-generating cells 12. A predetermined number of the power-generating cells 12 are stacked in the direction of the arrow A. Collecting electrodes 14, 16, which are electrically connected to the power-generating cells 12 in an integrated manner, are arranged on both end sides of the power-generating cells 12 in the stacking direction. A predetermined number of cooling cells 18 are interposed between the collecting electrodes 14, 16.

End plates 20a, 20b are arranged at the outside of the collecting electrodes 14, 16. The end plates 20a, 20b are tightened, for example, by means of unillustrated tie rods. Accordingly, the power-generating cells 12, the collecting electrodes 14, 16, and the cooling cells 18 are tightened and held in an integrated manner in the direction of the arrow A. For example, a load 22 such as a motor is connected to the collecting electrodes 14, 16.

Figure 4:
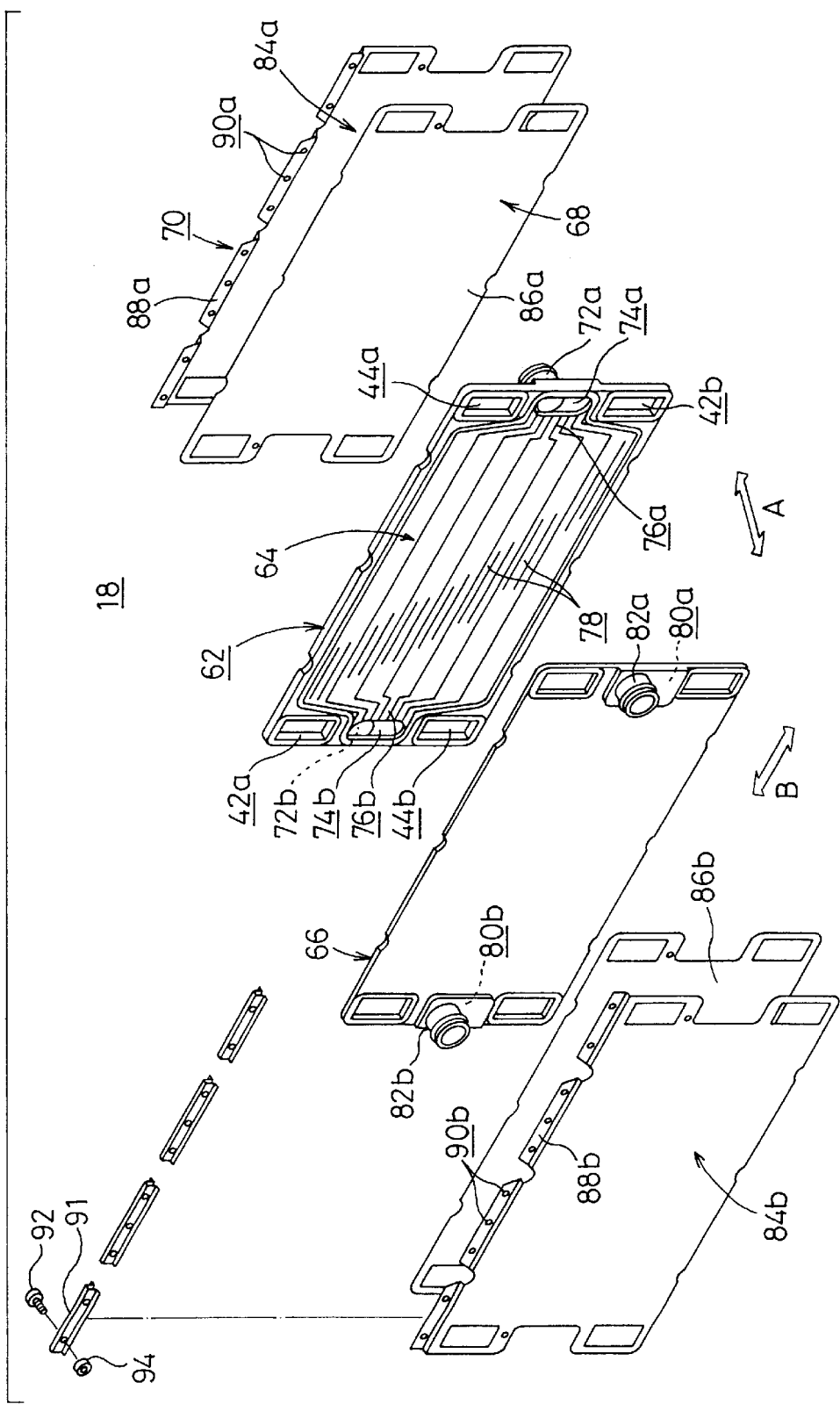
FIG. 4 shows an exploded perspective view illustrating a cooling cell for constructing the fuel cell stack.

As shown in FIGS. 2 to 4, each of the power-generating cells 12 includes a joined unit 30 which is arranged with a cathode electrode 26 and an anode electrode 28 to interpose therebetween an electrolyte layer 24 composed of a silicon carbide porous material or a basic polymer, for example, polybenzimidazole impregnated with phosphoric acid. Gas diffusion layers, each of which is composed of, for example, porous carbon paper as a porous layer, are arranged for the cathode electrode 26 and the anode electrode 28.

First and second gaskets 32, 34 are provided on both sides of the joined unit 30. The first gasket 32 has a large opening 36 for accommodating the cathode electrode 26. On the other hand, the second gasket 34 has a large opening 38 for accommodating the anode electrode 28. The joined unit 30 and the first and second gaskets 32, 34 are interposed between a pair of separators 40. Thus, the power-generating cell 12 is constructed.

The power-generating cell 12 is provided, at its upper portions at the both ends in the lateral direction (direction of the arrow B), with a fuel gas inlet passage 42a for allowing a fuel gas such as a hydrogen-containing gas to pass therethrough, and an oxygen-containing gas inlet passage 44a for allowing an oxygen-containing gas as a gas containing oxygen to pass therethrough. The power-generating cell 12 is provided, at its lower portions at the both ends in the lateral direction, with a fuel gas outlet passage 42b for allowing the fuel gas to pass therethrough, and an oxygen-containing gas outlet passage 44b for allowing the oxygen-containing gas to pass therethrough so that the fuel gas outlet passage 42b and the oxygen-containing gas outlet passage 44b are disposed at diagonal positions with respect to the fuel gas inlet passage 42a and the oxygen-containing gas inlet passage 44a respectively. Cutouts 45a, 45b are provided at central portions at the both ends in the lateral direction of the power-generating cell 12. A cooling medium supply tube passage 46 and a cooling medium discharge tube passage 48 are arranged at the cutouts 45a, 45b.

An oxygen-containing gas flow passage 50, which has its both ends communicating with the oxygen-containing gas inlet passage 44a and the oxygen-containing gas outlet passage 44b to supply the oxygen-containing gas to the cathode electrode 26, is formed on a surface of the separator 40 opposed to the cathode electrode 26 (see FIG. 3). A fuel gas flow passage 54, which has its both ends communicating with the fuel gas inlet passage 42a and the fuel gas outlet passage 42b to supply the fuel gas to the anode electrode 28, is provided on a surface of the separator 40 opposed to the anode electrode 28.

The cooling cells 18 are arranged at intervals of eight cells in the fuel cell stack 10. That is, eight individuals of the power-generating cells 12 are arranged and stacked between the cooling cells 18. As shown in FIGS. 2 and 3, each of separators 60 arranged on both surfaces of the cooling cell 18 is designed to have a separator structure equipped with gas flow passages on one surface in which the surface 60a on the side of the cooling cell 18 is formed to be flat.

Figure 5:
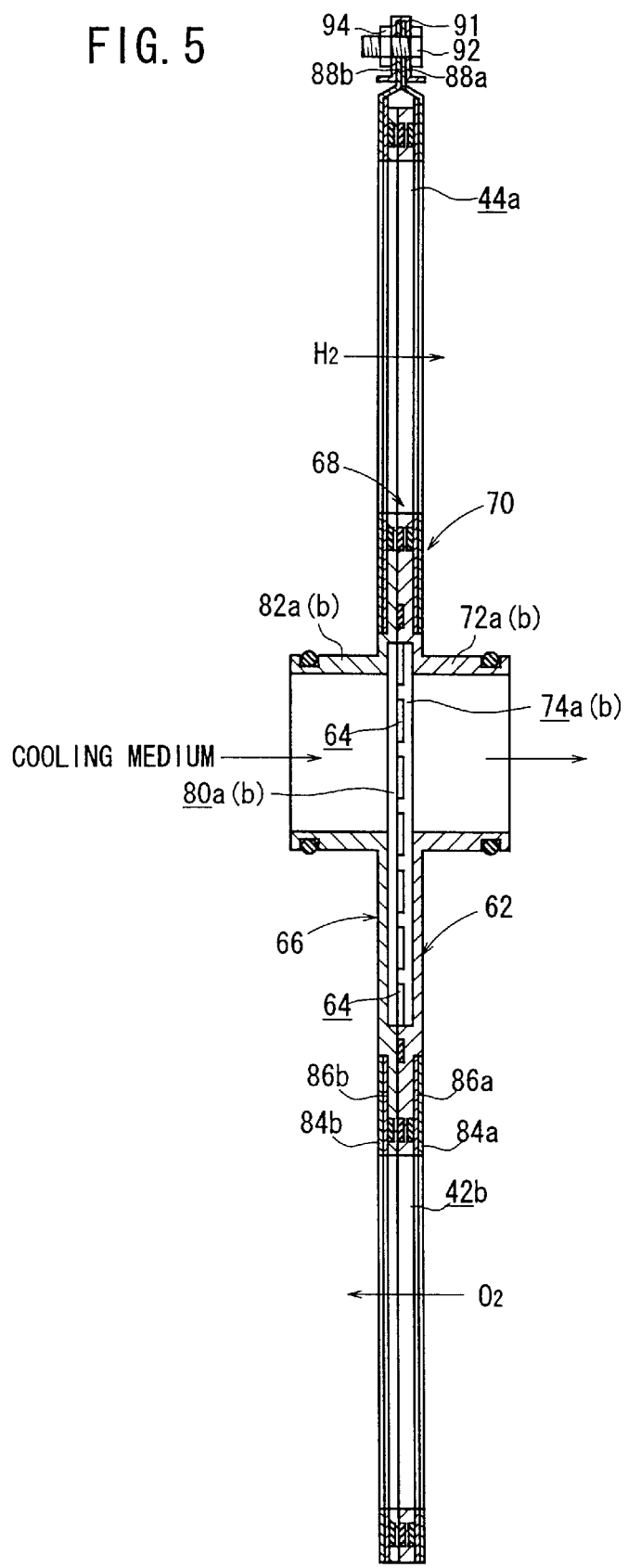
FIG. 5 shows a vertical sectional view illustrating the cooling cell.

As shown in FIGS. 3 to 5, the cooling cell 18 comprises a flow passage plate 62, a lid plate 66 for being superimposed on the flow passage plate 62 to form a cooling medium passage 64, an insulating means 68 for electrically insulating the cooling medium supplied to the cooling medium passage 64 from the power-generating cell 12 and the collecting electrodes 14, 16, and a conducting means 70 for electrically connecting the power-generating cells 12 to one another (or the power-generating cells 12 and the collecting electrodes 14, 16) with the cooling cell 18 interposed therebetween.

Figure 6:
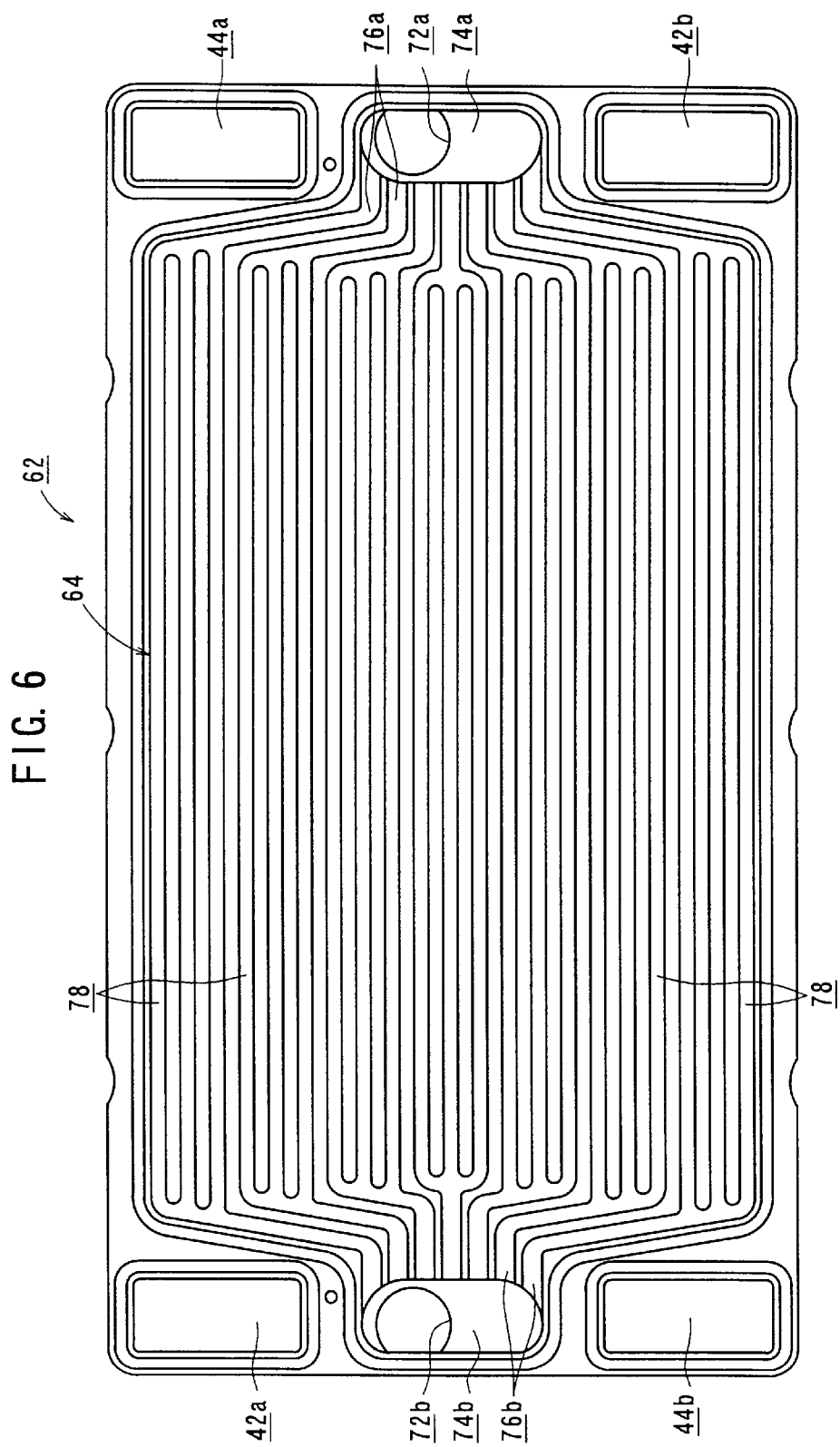
FIG. 6 shows a front view illustrating a flow passage plate for constructing the cooling cell.

The flow passage plate 62 is provided with cylindrical connecting sections 72a, 72b which protrude on the side of the first surface at central portions at both ends in the widthwise direction (direction of the arrow B). The cooling medium supply tube passage 46 and the cooling medium discharge tube passage 48 are connected to the connecting sections 72a, 72b. As shown in FIG. 6, grooves 74a, 74b, which communicate with the connecting sections 72a, 72b, are formed on the second surface side of the flow passage plate 62. A plurality of main flow passage grooves 76a, 76b, which constitute the cooling medium passage 64, communicate with the grooves 74a, 74b. The main flow passage grooves 76a, 76b are communicated with each other via branched flow passage grooves 78 which are branched into a plurality of individuals. The branched flow passage grooves 78 extend in the horizontal direction.

As shown in FIGS. 4 and 5, the lid plate 66 has grooves 80a, 80b which are formed on a surface opposed to the flow passage plate 62. Cylindrical connecting sections 82a, 82b, which protrude outwardly, are formed on a surface on the side opposite to the surface described above. The connecting sections 82a, 82b are provided at the same positions as those of the connecting sections 72a, 72b of the flow passage plate 62, and they are connected to the cooling medium supply tube passage 46 and the cooling medium discharge tube passage 48.

The conducting means 70 is provided with conducting plates 84a, 84b which are arranged in an integrated manner to cover the flow passage plate 62 and the lid plate 66. The insulating means 68 is provided with insulating sheet members 86a, 86b which are provided on the sides of the conducting plates 84a, 84b to make contact with the flow passage plate 62 and the lid plate 66. Each of the conducting plates 84a, 84b is composed of a conductive metal plate. Each of the insulating sheet members 86a, 86b is formed of an insulating material, for example, polytetrafluoroethylene (PTFE) to be stuck to the entire surface of the conducting plate 84a, 84b by the aid of an adhesive or the like.

Adapting sections 88a, 88b, which are bent in directions to approach one another, are provided at upper end portions of the conducting plates 84a, 84b respectively. Holes 90a, 90b are formed through the adapting sections 88a, 88b. Fixing plate members 91 are arranged to cover the adapting sections 88a, 88b. Screws 92 are inserted from the fixing plate members 91 into the holes 90a, 90b, and nuts 94 are screw-engaged with the screws 92. Thus, the conducting plates 84a, 84b hold the flow passage plate 62 and the lid plate 66, and they are integrated into one unit.

As shown in FIG. 2, the end plate 20a is formed with a fuel gas inlet 96a which communicates with the fuel gas inlet passage 42a, a fuel gas outlet 96b which communicates with the fuel gas outlet passage 42b, an oxygen-containing gas inlet 98a which communicates with the oxygen-containing gas inlet passage 44a, an oxygen-containing gas outlet 98b which communicates with the oxygen-containing gas outlet passage 44b, a cooling medium inlet 100a, and a cooling medium outlet 100b.

Explanation will be made below for the operation of the fuel cell stack 10 according to the embodiment of the present invention constructed as described above.

The fuel gas, for example, the gas containing hydrogen obtained by reforming hydrocarbon, or pure hydrogen from a hydrogen bomb or hydrogen-absorbing alloy is supplied to the inside of the fuel cell stack 10, and the gas containing oxygen as the oxygen-containing gas (hereinafter referred to as "air" as well) is supplied thereto. Further, the cooling medium such as water is supplied in order to cool the power-generating surface of the power-generating cell 12.

As shown in FIG. 2, the fuel gas, which is supplied to the fuel gas inlet 96*a* of the end plate 20*a*, is supplied via the fuel gas inlet passage 42*a* to the fuel gas flow passage 54 formed on the separator 40. Accordingly, the hydrogen-containing gas in the fuel gas is supplied to the anode electrode 28 of the power-generating cell 12, and the fuel gas, which is not used, is discharged to the fuel gas outlet passage 42*b*.

The air, which is supplied to the oxygen-containing gas inlet 98*a* of the end plate 20*a*, is introduced via the oxygen-containing gas inlet passage 44*a* into the oxygen-containing gas flow passage 50 formed on the separator. Therefore, the oxygen-containing gas in the air is supplied to the cathode electrode 26, and the air, which is not used, is discharged to the oxygen-containing gas outlet passage 44*b*. Accordingly, the electric power is generated in the power-generating cell 12, and the electric power is supplied to the load 22 such as a motor (see FIG. 1).

Further, the cooling medium, which is supplied to the cooling medium inlet 100*a* of the end plate 20*a*, is introduced into the cooling medium supply tube passage 46, and then it is supplied to the cooling medium passage 64 which is formed between the lid plate 66 and the flow passage plate 62 for constructing the cooling cell 18. As shown in FIG. 6, in the flow passage plate 62, the cooling medium is introduced from the connecting section 72*a* into the groove 74*a*. The cooling medium is fed from the main flow passage grooves 76*a* communicating with the groove 74*a*, and it passes through the branched flow passage grooves 78 to cool the power-generating surface of the power-generating cell 12. After that, the cooling medium is merged to the main flow passage grooves 76*b*. Further, the cooling medium, which has been used, passes through the cooling medium discharge tube passage 48, and it is discharged from the in cooling medium outlet 100*b* of the end plate 20*a*.

In this arrangement, in the embodiment of the present invention, the cooling cells 18 are independently constructed. The flow passage plate 62 and the lid plate 66, which form the cooling medium passage 64, are covered with the conducting plates 84*a*, 84*b* provided with the insulating sheet members 86*a*, 86*b* (see FIG. 3). Accordingly, the cooling medium passage 64 is electrically insulated from the power-generating cell 12. The electricity, which is generated in the power-generating cell 12, does not flow into the cooling medium in the cooling medium passage 64. Accordingly, the following effect is obtained. That is, neither earth fault nor liquid junction occurs, which would be otherwise caused by the aid of the cooling medium. It is possible to reliably avoid any decrease in output of the entire fuel cell stack 10. It is possible to reliably maintain the desired power-generating function.

Further, even when any conductivity is given to the cooling medium, the power generation performance of the power-generating cell 12 is not affected thereby in accordance with the action of the insulating means 68. Therefore, the following advantage is obtained. That is, for example, a general water-based cooling medium, which contains ions and metal-based additives, can be used. It is possible to simplify the entire equipment, and the system is economic. Especially, it is unnecessary to use a large-scale pump for circulating the cooling medium, which would be otherwise used due to the increase in viscosity and the decrease in thermal conductivity, for example, when the cooling medium having no conductivity such as silicone oil used. The conventional equipment can be effectively used, and it is easy to miniaturize the entire equipment. Further, it is also unnecessary to provide any cleaning apparatus for the cooling medium. Thus, the simplification of the entire equipment is achieved.

Figure 7:
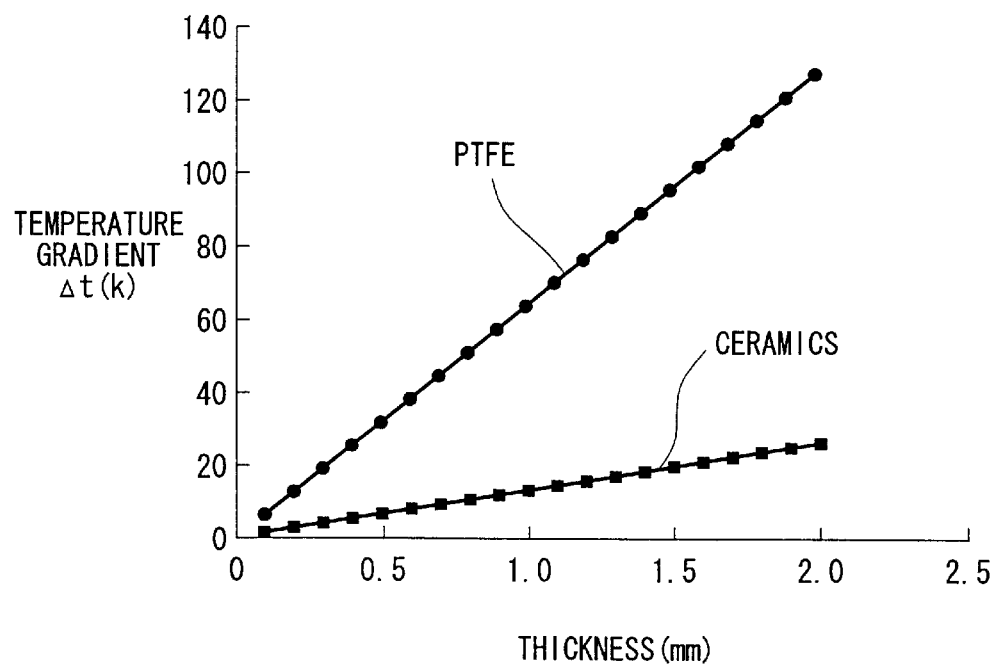
FIG. 7 illustrates a relationship between the thickness of an insulating sheet member and the temperature gradient in the insulating sheet member.

The insulating sheet member 86*a*, 86*b* is composed of a resin-based material such as polytetrafluoroethylene or an insulative ceramic material. The heat resistance of the heat transfer pathway for the heat generated by the power-generating cell 12 can be changed by controlling the thickness of the insulating sheet member 86*a*, 86*b* (see FIG. 7). Accordingly, an effect is obtained such that the temperature of the cooling medium can be reliably set to have a desired value.

In the embodiment of the present invention, owing to the use of the independent cooling cell 18, it is unnecessary to provide any cooling medium passage in the power-generating cell 12 itself. Accordingly, the bipolar type separator 40, in which the fuel gas flow passage and the oxygen-containing gas flow passage are provided on the both surfaces, can be used. The length of the entire fuel cell stack 10 in the direction of the arrow A is greatly shortened. Especially, in the case of the phosphoric acid fuel cell, the following effect is obtained. That is, it is possible to design a wide arrangement interval for the cooling cells 18, because the operation temperature is high as compared with the solid polymer fuel cell. It is possible to greatly shorten the entire length of the fuel cell stack 10.

The embodiment of the present invention has been explained with the insulating sheet members 86*a*, 86*b* as the insulating means 68. However, there is no limitation thereto. It is possible to avoid the use of the insulating sheet members 86*a*, 86*b* by forming the flow passage plate 62 and the lid plate 66 to function as the main cooling cell body with an insulating material.

The embodiment of the present invention has been explained with the conducting plates 84*a*, 84*b* as the conducting means 70. In place of the conducting plate 84*a*, 84*b*, as shown in FIG. 8, the power-generating cells 12, which are arranged on the both sides of the cooling cell 18, may be electrically connected to one another with a conducting wire 100 such as a lead wire.

In the fuel cell stack according to the present invention, the cooling medium for cooling the power-generating cell is electrically insulated from the power-generating cell and the collector electrodes. Therefore, neither earth fault nor liquid junction occurs, which would be otherwise caused by the aid of the cooling medium. It is possible to reliably maintain the desired power generation performance. Further, the power-generating cells, which are arranged with the cooling cell intervening therebetween, are electrically connected to one another, or the power-generating cells and the collecting electrodes are electrically connected to one another. Therefore, it is possible to maintain the desire power generation performance as the entire fuel cell stack.

What is claimed is:

1. A fuel cell stack comprising:
a power generating cell which has a joined unit including an electrolyte interposed between an anode electrode and a cathode electrode, said joined unit being interposed between separators so that fuel gas is supplied to said anode electrode, while oxygen-containing gas is supplied to said cathode electrode;

a pair of collecting electrodes which are electrically connected to a predetermined number of said power-generating cells in an integrated manner;

a cooling cell to which cooling medium for cooling said power-generating cell is supplied and which is interposed between said collecting electrodes;

an insulating means for electrically insulating said cooling medium from said power-generating cell and said collecting electrodes; and a conducting means for electrically connecting said power-generating cells arranged with said cooling cell interposed therebetween, or for electrically connecting said power-generating cell and said collecting electrodes to one another.

2. The fuel cell stack according to claim 1, wherein said cooling cell is provided with a flow passage plate to form a cooling medium passage, and a lid plate opposing to said flow passage plate, said flow passage plate and said lid plate are provided with cylindrical connecting sections, which protrude outside and are connected to a cooling medium supply tube passage and a cooling medium discharge tube passage, respectively, and wherein said power-generating cell is provided with cutouts at which said cooling medium supply tube passage and said cooling medium discharge tube passage are arranged.

3. The fuel cell stack according to claim 2, wherein said insulating means is provided with insulating sheet members arranged with said flow passage plate and said lid plate interposed therebetween, and wherein said conducting means is provided with conducting plates arranged with said insulating sheet members interposed therebetween.

4. The fuel cell stack according to claim 3, wherein adapting sections, which are bent in directions to approach on another, are provided at end portions of said conducting plates, respectively, and wherein a fixing plate member is provided to fix said adapting sections to one another.

5. The fuel cell stack according to claim 1, wherein said insulating means is provided with insulating sheet members arranged on both surfaces of said cooling cell.

6. The fuel cell stack according to claim 1, wherein said insulating means is provided with a main cooling cell body made of an insulating material.

7. The fuel cell stack according to claim 1, wherein said conducting means is provided with conducting plates arranged in an integrated manner to cover both surfaces of said cooling cell.

8. The fuel cell stack according to claim 7, wherein adapting sections, which are bent in directions to approach one another, are provided at end portions of said conducting plates, respectively, and wherein a fixing plate member is provided to fix said adapting sections to one another.

9. The fuel cell stack according to claim 1, wherein said conducting means is provided with a conducting wire for electrically connecting said power-generating cells arranged with said cooling cell interposed therebetween, or for electrically connecting said power-generating cell and said collecting electrodes to one another.

* * * * *